April 7, 1925.
B. F. SEYMOUR
VEHICLE BODY SUSPENSION
Filed June 22, 1920
1,532,605
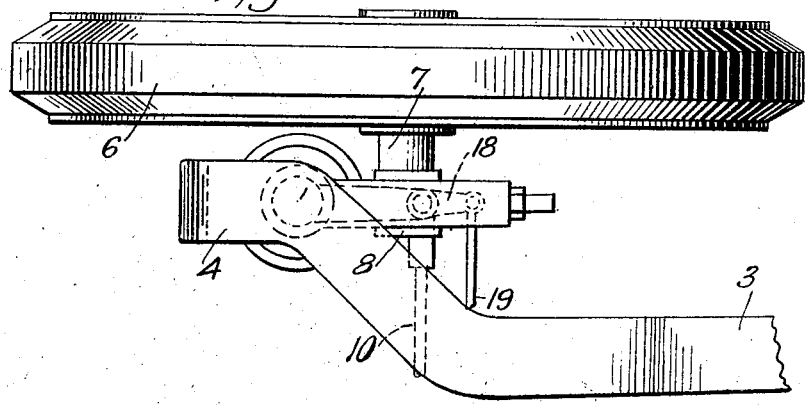
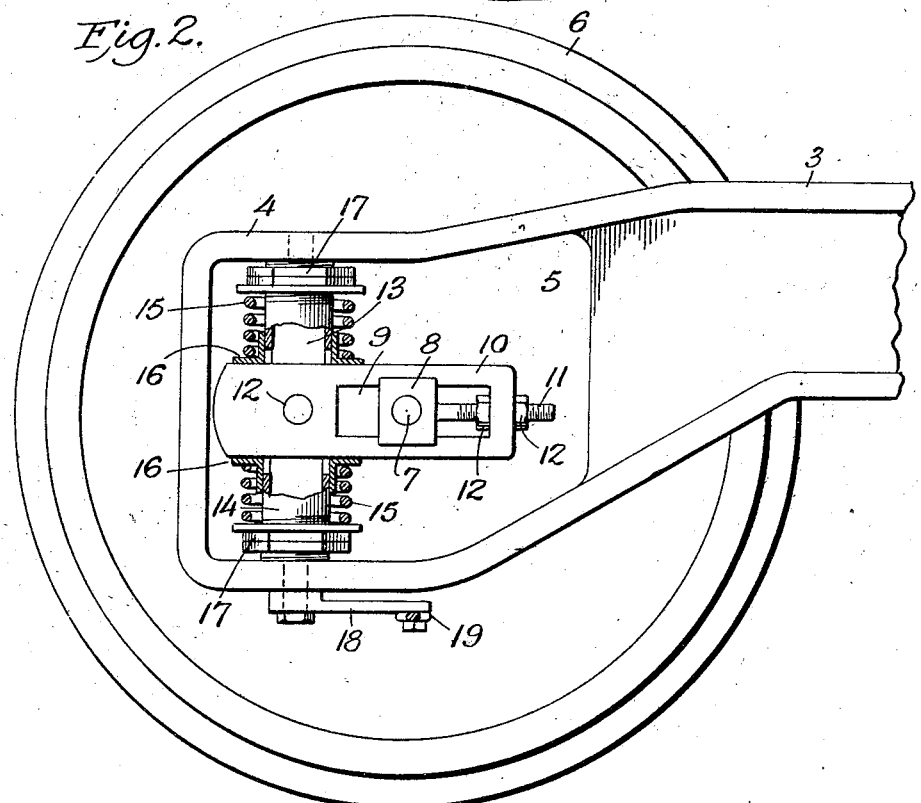

Patented Apr. 7, 1925.

1,532,605

UNITED STATES PATENT OFFICE.

BENJAMIN F. SEYMOUR, OF WASHINGTON, DISTRICT OF COLUMBIA.

VEHICLE BODY SUSPENSION.

Application filed June 22, 1920. Serial No. 390,825.

*To all whom it may concern:*

Be it known that I, BENJAMIN F. SEYMOUR, a citizen of the United States, residing at Washington, in the District of Columbia, have invented certain new and useful Improvements in Vehicle Body Suspensions; and I do hereby declare the following to be a full, clear, and exact description of the invention, such as will enable others skilled in the art to which it appertains to make and use the same.

The present invention relates to resilient suspensions for vehicle bodies and consists in the combinations and arrangements of elements hereinafter described and particularly set forth in the accompanying claims.

The purpose of the invention is to provide the body of a vehicle, especially of the motor driven type, with resilient means for indirectly absorbing and dissipating all shocks or jars to which the vehicle wheel is subjected, and without causing undue strain on either the wheel or its axle or transmitting excessive vibration to the supported load.

Another object of the resilient suspension as proposed herein is the employment of apparatus and disposal of the elements thereof in such a manner as will secure the maximum stability of the resilient sustaining structure, and equitable location or distribution of the resilient devices per se with regard to the chassis or frame on which the same are mounted.

The principal application of the invention is at the front or steering wheels of the car and in which location it is very essential that the wheel be secured to the chassis in a manner giving the required stability and yet affording the needed resiliency to the car body.

The invention is disclosed by way of illustration in the accompanying drawings, wherein:

Figure 1 is a top plan view thereof,

Figure 2 a side elevational view with parts shown in section.

Referring to the construction in further detail, and wherein like reference characters designate corresponding parts in the views shown, 3 indicates the chassis or frame of the vehicle having its end portion 4 slightly dropped and cut away as at 5 to give the necessary space for the resilient mounting as shown.

The wheel 6 has its axle 7 suitably mounted in a block 8 that is laterally adjustable within the open portion 9 of the supporting member 10, and said member 8 is grooved on its upper and lower edges to engage said supporting member 10 with a sliding fit as shown. The means for adjusting the member 8 comprises a threaded member 11 and the pair of nuts 12 screwed thereon and clamping against opposite sides of the supporting member 10 as shown.

The supporting member 10, which may be properly defined as an arm or lever, is fulcrumed at 12 to the turning post or upright bearing 13 and projects to either side thereof, and this in turn is mounted for angular lateral movement in the chassis portion 4. Said turning post is suitably secured within the upper and lower portions of the chassis extension 4 as shown.

A pair of independent and oppositely acting springs 15 are fitted on the turning post 13 and respectively engage with the pair of flanged collars 16, which in turn contact with opposite portions of the fulcrumed arm 10. The degree of tension exerted by the springs 15 against said flanged collars is regulated by the pair of nuts 17 screw threaded on the member 13 and contacting with the distal ends of the springs as shown.

The turning post 13 is also provided with the usual arm 18 for connecting with the steering rod 19, and a cross rod 20, which function in the usual way.

In operation, any relative movement between the vehicle body and the wheel axle will cause a vertically angular movement of the arm or lever 10 on its fulcrum 12 and this in turn will simultaneously compress the pair of springs 15 between the collars 16 and nuts 17, and in this way the shock is absorbed in a quiet and easy manner; and it will be noted that by varying the fulcrum of said lever 10 the degree of compression on said springs may be regulated.

It is obvious that those skilled in the art may vary the details of construction and arrangement of parts without departing from the spirit of my invention, and therefore I do not wish to be limited to such features except as may be required by the claims.

Having thus described my invention, what I claim as new and desire to protect by United States Letters Patent is:

1. In a vehicle body suspension, the combination of a chassis, a wheel, an axle, a supporting post mounted on the chassis, an arm mounted on said post and supporting the axle, a pair of springs mounted on said post intermediate the arm and the chassis, collars interposed between said springs and the arm, and means for adjusting the tension of said springs, for the purpose set forth.

2. In a vehicle body suspension, the combination of a chassis, a wheel, an axle, a supporting post swiveled on the chassis, an arm fulcrumed on said post and supporting the axle, a pair of springs mounted on said post intermediate the arm and the chassis, collars on the swiveled post interposed between said springs and the arm, and nuts screw threaded on said post and providing adjustable abutments for said springs, substantially as set forth.

3. In a vehicle body suspension, the combination of a chassis, a wheel, an axle, a steering post swiveled on the chassis, an arm fulcrumed on said steering post and projecting to opposite sides thereof, said axle adjustably mounted on said arm, a pair of springs mounted on said post intermediate the arm and the chassis, a pair of collars slidably mounted on the swiveled post between said springs and the arm, and nuts screw threaded on said post and providing adjustable abutments for said springs, substantially as set forth.

In testimony whereof I affix my signature.

BENJAMIN F. SEYMOUR.